United States Patent
Stringer et al.

(10) Patent No.: US 9,166,214 B2
(45) Date of Patent: Oct. 20, 2015

(54) SEAL RING AND ASSOCIATED METHOD

(75) Inventors: Craig Stringer, Ballston Spa, NY (US);
Charles Dominic Iacovangelo, Saratoga Springs, NY (US); Dennis Joseph Dalpe, Schenectady, NY (US); James Scott Vartuli, Rexford, NY (US); James Anthony Brewer, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1645 days.

(21) Appl. No.: 12/193,796

(22) Filed: Aug. 19, 2008

(65) Prior Publication Data

US 2009/0011331 A1 Jan. 8, 2009

(51) Int. Cl.
| | |
|---|---|
| *H01M 2/26* | (2006.01) |
| *H01M 8/02* | (2006.01) |
| *H01M 2/08* | (2006.01) |
| *C04B 35/645* | (2006.01) |
| *C04B 37/02* | (2006.01) |
| *C22C 1/05* | (2006.01) |
| *C22C 29/12* | (2006.01) |

(Continued)

(52) U.S. Cl.
CPC ............. *H01M 2/08* (2013.01); *C04B 35/6455* (2013.01); *C04B 37/021* (2013.01); *C22C 1/051* (2013.01); *C22C 29/12* (2013.01); *H01M 8/0276* (2013.01); *H01M 8/0282* (2013.01); *H01M 8/0286* (2013.01); *C04B 2235/661* (2013.01); *C04B 2237/343* (2013.01); *C04B 2237/403* (2013.01); *H01M 2/26* (2013.01); *H01M 2/263* (2013.01); *H01M 2/266* (2013.01); *H01M 2/28* (2013.01); *H01M 8/028* (2013.01); *H01M 8/0271* (2013.01); *H01M 10/3909* (2013.01); *Y02E 60/50* (2013.01); *Y10T 29/4911* (2015.01)

(58) Field of Classification Search
CPC ... H01M 2/08; H01M 2/0276; H01M 8/0271; H01M 8/028; H01M 8/0282; H01M 10/3909; H01M 2/26; H01M 2/266; H01M 2/28; H01M 2/263; Y02E 60/50; C04B 35/6455; C04B 37/021; C04B 2235/661; C04B 2237/342; C04B 2237/403; C22C 1/051; C22C 29/12; Y10T 29/4911
USPC ....................................... 313/634; 429/31–33
See application file for complete search history.

(56) References Cited

U.S. PATENT DOCUMENTS

| | | | |
|---|---|---|---|
| 4,354,964 A | 10/1982 | Hing et al. | |
| 5,529,858 A | 6/1996 | Wicker et al. | |

(Continued)

FOREIGN PATENT DOCUMENTS

| | | |
|---|---|---|
| DE | 19935484 A1 | 2/2000 |
| EP | 0556402 A1 | 8/1993 |

(Continued)

OTHER PUBLICATIONS

Weld Definition: Random House Dictionary 2014.*

(Continued)

*Primary Examiner* — Milton I Cano
*Assistant Examiner* — Stephen Yanchuk
(74) *Attorney, Agent, or Firm* — Scott J. Asmus

(57) ABSTRACT

An article includes a seal ring for an energy storage device. The seal ring has a weldable first portion and a weldable second portion. The first and second portions are electrically isolatable from each other by an electrically insulating third portion.

14 Claims, 1 Drawing Sheet

(51) Int. Cl.
*H01M 2/28* (2006.01)
*H01M 10/39* (2006.01)

(56) References Cited

U.S. PATENT DOCUMENTS

| | | | |
|---|---|---|---|
| 6,181,065 B1 | 1/2001 | Huettinger et al. | |
| 6,541,146 B1 * | 4/2003 | Xue et al. | 429/469 |
| 2006/0012306 A1 | 1/2006 | Bewlay et al. | |
| 2006/0051643 A1 * | 3/2006 | Sarkar et al. | 429/31 |
| 2006/0286417 A1 * | 12/2006 | Aoyama et al. | 429/19 |
| 2007/0120491 A1 * | 5/2007 | Bewlay et al. | 313/634 |
| 2011/0053041 A1 * | 3/2011 | Tucker et al. | 429/486 |

FOREIGN PATENT DOCUMENTS

| | | |
|---|---|---|
| JP | 01252587 A | 10/1989 |
| JP | 10223256 A | 8/1998 |
| WO | WO03096470 A1 | 11/2003 |
| WO | WO2006017191 A3 | 2/2006 |

OTHER PUBLICATIONS

PCT International Search Report dated Oct. 6, 2009.
Unofficial English translation of Office Action issued in connection with corresponding JP Application No. 2011-523842 on Dec. 3, 2013.

* cited by examiner

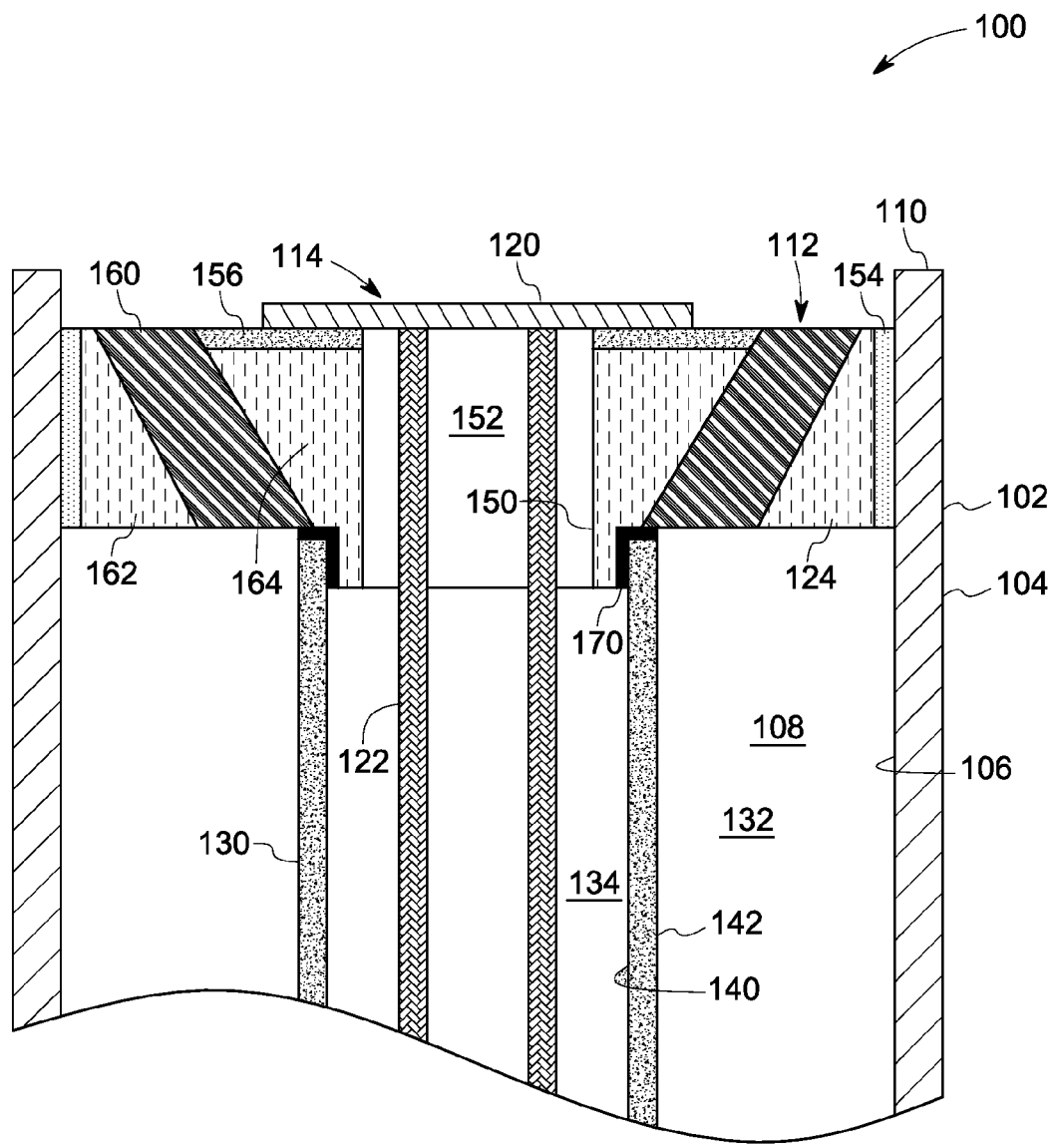

SEAL RING AND ASSOCIATED METHOD

BACKGROUND

1. Technical Field

The invention includes embodiments that relate to a sealing material and seal ring for an energy storage device. The invention includes embodiments that relate to a method of sealing an electrochemical cell.

2. Discussion of Related Art

Development work has been undertaken on high temperature rechargeable batteries using sodium for the negative electrodes. The liquid sodium negative electrode is separated from a positive electrode by a sodium-ion conducting solid electrolyte. Suitable material includes beta alumina and beta" alumina, known as beta alumina separator electrolyte (BASE). Some electrochemical cells have a metallic casing. Interior parts of the battery and the metallic casing may seal to interior parts of the battery. The ceramic parts of the cell can be joined via a seal glass. The seal glass may have undesirable characteristics associated with its use. Metallic parts can be joined by welding or thermal compression bonding. Bonded parts formed from dissimilar materials in a high temperature cell may crack resulting due to thermal stress caused by mismatch in the coefficient of thermal expansion. The coefficient of thermal expansion for a ceramic part and a metal part can be very dissimilar. The bond may have a limited life, and bond failure may cause cell failure.

It may be desirable to have a sealing material for an energy storage device that differs from those sealing materials that are currently available. It may be desirable to have a seal structure that differs from those seal structures that are currently available. It may be desirable to have a method of sealing an energy storage device that differs from those methods that are currently available.

BRIEF DESCRIPTION

In accordance with an embodiment of the invention, an article is provided that includes a seal ring for an energy storage device. The seal ring includes a weldable first portion and a weldable second portion. The weldable first portion and the weldable second portion are electrically isolatable from each other by an electrically insulating third portion.

In accordance with an embodiment of the invention, an article is provided that includes a seal ring for use in an energy storage device. The seal ring includes a first portion and a second portion. Each of the first portion and the second portion include an alumina-based cermet having an amount of metal sufficient to allow for welding of the seal ring. A third region intervenes between the first portion and the second portion, and which is electrically insulating so that it electrically isolates the first portion from the second portion.

An energy storage device is provided in one embodiment of the invention. The device includes an ion-conductive and electrically insulative alumina based separator. The separator has a first surface that defines at least a portion of a first chamber, and a second surface that defines a second chamber, and the first chamber is in ionic communication with the second chamber through the separator. The device further includes a cathodic material. The cathodic material includes a metal halide in communication with the separator and capable of forming an ion capable of being conducted through the separator. Furthermore the device includes a seal ring. The seal ring includes a first portion and a second portion that each includes an alumina-based cermet. A third region intervenes between the first portion and the second portion of the seal ring and is electrically insulating. The seal ring is resistant to corrosion or degradation by contact of a reaction product of the metal halide formed during operation of the energy storage device.

The second chamber, in one embodiment, is an anode chamber that can include molten anodic material during use. Suitable anodic material can include sodium metal. Portions of the ring surface and/or portions of a weld structure and/or portions of a glassy seal may be exposed to, among other things, sodium metal vapor at elevated temperatures, thermal cycling with respect to thermal expansion coefficient mismatch, and the like. Selection of material and features of the seal ring, weld structure, and glassy seal should account for operating conditions.

In accordance with an embodiment of the invention, a method of forming a seal ring is provided that is capable of sealing an energy storage device. The seal ring has a high metal content first portion, or is weldable at that first portion; and, has a high metal content second portion, or is weldable at that second portion. And, the first portion is electrically isolated from that second portion by an electrically insulating portion.

BRIEF DESCRIPTION OF DRAWING FIGURES

FIG. 1 is a cross sectional side view schematic of an article according to one embodiment of the invention.

DETAILED DESCRIPTION

The invention includes embodiments that relate to a sealing material and a seal ring for an energy storage device. The invention includes embodiments that relate to a method of sealing an electrochemical cell in the energy storage device.

As used herein, cathodic material is the material that supplies electrons during charge and is present as part of a redox reaction. Anodic material accepts electrons during charge and is present as part of the redox reaction. A monolith is a single block or piece, as distinguished from a part made by fusing or bonding multiple blocks or pieces together.

The term weld is used to unite or fuse (as pieces of metal) by heat or compression. For ease of illustration, unless indicated otherwise by language or context the term "weld" includes thermal compression bonding, soldering, and brazing, in addition to the traditional meaning of weld. For the weld, suitable energy sources can include a flame, plasma, an electric arc, a laser, an electron beam, friction, RF and ultrasound. In one embodiment, the weld coalesces the parts to be joined. Coalescence occurs where two or more pieces of weldable material are bonded together by liquefying the places where they are to be bonded, flowing these liquids together, and allowing the liquid to solidify. At the end of the coalescence process the two pieces have become one continuous solid.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, an article is provided that includes a seal ring for an energy storage device. The seal ring includes a weldable first portion and a weldable second portion. The weldable first portion and the weldable second portion are electrically isolatable from each other by an electrically insulating third portion. In one embodiment, the seal ring is a monolith.

The weldable first portion and the weldable second portion can be defined by composition and/or function. The weldable first portion does not need to have the same composition as the weldable second portion. In instances where the weldable first portion seals to a part that differs from a part to which the weldable second portion seals, the weldable portions may differ in composition from each other. In one embodiment, the weldable first portion and the weldable second portion may have the same cermet, that is, the same ceramic-metal composition. In one embodiment, the weldable first portion and the weldable second portion may include different cermets. The compositions of the cermet for the weldable first portion and the weldable second portion may differ in terms of the type or amount of ceramic material present in the cermet, the type or amount of metal present in the cermet, and the proportion of the metal to the ceramic present in the cermet.

On the seal ring, the function relates to the ability to weld or compression bond to a mating surface. With regard to the composition, the seal ring includes a cermet that defines the boundaries of the weldable first portion and the weldable second portion. Cermet is a composite material composed of a ceramic and a metallic material. The cermet properties depend on such factors as the individual properties of the ceramic and of the metal, the amount and the relationship of the ceramic to the metal in the cermet composition, and other factors.

The ceramic material of the cermet may include one or more of alumina, silica, yttria or ytterbia. Suitable alumina may be in the form of single crystal sapphire or microgram polycrystalline alumina (μPCA). The silica may be in form of garnet. Other suitable mixtures of materials or forms may include spinel, yttrium-aluminum-garnet, ytterbium-aluminum-garnet. In one embodiment, the cermet ceramic material consists essentially of only one of microgram polycrystalline alumina (μPCA), yttrium-aluminum-garnet or ytterbium-aluminum-garnet. In one embodiment, the ceramic material consists essentially of alumina.

A suitable cermet may include a refractory metal disposed in defined portions or zones. Suitable refractory metals may include those that allow for welding. Examples of suitable refractory metals may include one or more of molybdenum, rhenium, tantalum or tungsten. In one embodiment, the cermet may include only one of molybdenum, rhenium, tantalum or tungsten. In one embodiment, the cermet may include two of the refractory metals selected from molybdenum, rhenium, tantalum or tungsten. The cermet may include a refractory metal that consists essentially of tungsten. The cermet may include a refractory metal that consists essentially of molybdenum.

The cermet weldability performance in the weldable first portion and the weldable second portion may depend at least in part on the type and amount of the refractory metal present. The proportion of the refractory metal in the cermet may be less than about 90 volume percent. In one embodiment, the proportion of the refractory metal in the cermet may be in a range of from about 100 volume percent to about 50 volume percent, from about 50 volume percent to about 45 volume percent, from about 45 volume percent to about 35 volume percent, from about 35 volume percent to about 30 volume percent, from about 30 volume percent to about 25 volume percent, from about 25 volume percent to about 20 volume percent, from about 20 volume percent to about 15 volume percent, from about 15 volume percent to about 10 volume percent, from about 10 volume percent to about 5 volume percent, or from about 5 volume percent to about 1 volume percent. In one embodiment, the proportion of the refractory metal in the cermet may be less than about 1 volume percent.

Optionally, the weldable first portion and/or the weldable second portion each may include a unidirectional functionally graded cermet. The functionally graded cermet is a composite of a ceramic and a metal in which the proportion of the metal to ceramic changes as a function of distance in one direction. Control over the proportion or ratio of the metal to the ceramic provides control over properties of the functionally graded cermet. Such properties include one or more of coefficient of thermal expansion (CTE), poison's ratio, elastic modulus, crack resistance, impact resistance, electrical conductivity, oxidation, dross, slag, thermal stability, chemical resistance, melt temperature, weldability, and the like. Further, in one embodiment, the weldable first portion and/or the weldable second portion each may include a bi-directional functionally graded cermet. In such an embodiment, the proportion or ratio of the ceramic to the metal changes as a function of distance in two different directions. The proportion or ratio change over distance may be continuous and uniform over the distance, may be continuous and accelerating or decelerating over the distance, or may be a step function having discrete segments of substantially non-changing proportion or ratio.

The compositions of the cermet for the weldable first portion and the weldable second portion may be selected to minimize or eliminate thermal stress. The thermal stress may be due to coefficient of thermal expansion mismatch among different components of the device. A higher proportion of the refractory metal in the weldable portions may be welded relatively easily to other metallic components or parts.

In one embodiment, the weldable portion or zone includes steel. Stainless steels or corrosion-resisting steels are a family of iron-base alloys having relatively high resistance to corrosion. These steels do not rust and resist attack by many liquids, gases, and chemicals. Many of the stainless steels have good low-temperature toughness and ductility. Most of them exhibit good strength properties and resistance to scaling at high temperatures. All stainless steels contain iron as the main element and chromium in amounts ranging from about 11 percent to about 30 percent. Chromium provides the basic corrosion resistance to stainless steels. In one embodiment, the weldable portion or zone includes nickel, and may consist essentially of nickel.

Selection of metal(s) for use in weldable portions may include reference to the mating weld surface. In one embodiment, the mating weld surface is chromium-nickel stainless steel. While other mating weld surfaces are contemplated, stainless steel is discussed here as an example of metal selection considerations. In one embodiment, iron and nickel content in the weld structure may be controlled to affect the thermal conductivity and the electrical conductivity. The chromium-nickel steels belong to AISI/SAE 300 series of stainless steels, which may be selected with reference to the above-identified criteria. The stainless steel mating surface may be nonmagnetic and have a controlled grain size, grain orientation, or microstructure, such as austenitic or martensitic microstructures. Weldable portions or weldable zones may be formed to match the properties, composition and characteristics of the corresponding mating surface to which it is to be welded.

Manganese may be added to some of the weldable portions. Nickel may be replaced by manganese, possibly in a two-to-one relationship. With regard to the housing, the AISI/SAE 200 series of stainless steels are the chromium-nickel-manganese series, and these steels have an austenitic microstructure and they are nonmagnetic. Molybdenum may be included in the weldable portions. Molybdenum may improve the creep resistance at elevated temperatures, and may increase resistance to pitting and corrosion.

The weldable first portion may contact a first pole and the weldable second portion may contact a second pole of the energy storage device. A pole is an electrode of the device. The first pole of the energy storage device may be positive and the second pole may be negative.

The electrically insulating third portion electrically isolates the weldable first portion from the weldable second portion. The third portion may physically separate the anodic material from the cathodic material. The third portion may include or be formed from an electrically insulating material. Suitable material for use as electrically insulating material may include alumina. The dielectric strength of the material in the third portion or zone is greater than the voltage or current potential differential between the anode and cathode material. If a lower dielectric constant material is used, the width of the third zone may be selected to be larger—and the reverse configuration is available. In one embodiment, the third zone or portion has the composition and properties listed in Table 1.

TABLE 1 third zone properties

| PROPERTY | UNITS OF MEASURE | VALUE |
|---|---|---|
| Density | gm/cc | 3.89 |
| Porosity | % | 0 |
| Flexural Strength | MPa (lb/in$^2$ × 10$^3$) | 379 |
| Elastic Modulus | GPa (lb/in$^2$ × 10$^6$) | 375 |
| Shear Modulus | GPa (lb/in$^2$ × 10$^6$) | 152 |
| Bulk Modulus | GPa (lb/in$^2$ × 10$^6$) | 228 |
| Poisson's Ratio | — | 0.22 |
| Compressive Strength | MPa (lb/in$^2$ × 10$^3$) | 2600 |
| Hardness | Kg/mm$^2$ | 1440 |
| Fracture Toughness K$_{IC}$ | MPa · m$^{1/2}$ | 4 |
| Maximum Use Temperature (no load) | ° C. | 1750 |
| Thermal Conductivity | W/m ° K | 35 |
| Coefficient of Thermal Expansion | 10$^{-6}$/° C. | 8.4 |
| Specific Heat | J/Kg · ° K | 880 |
| Dielectric Strength | ac-kv/mm | 16.9 |
| Dielectric Constant | @ 1 MHz | 9.8 |
| Dissipation Factor | @ 1 kHz | 0.0002 |
| Loss Tangent | @ 1 kHz | — |
| Volume Resistivity | ohm · cm | >10$^{14}$ |

In one embodiment, the seal ring for the device may include a fourth portion. The fourth portion may secure to the ion-conductive separator. The fourth portion may be formed from a material selected to have a coefficient of thermal expansion matching with that of the ion-conductive separator. The fourth portion may include a modified alumina. As a coefficient of thermal expansion of modified alumina fourth portion may match that of an ion-conductive alumina separator, the fourth portion of the seal ring may protect the seal ring as well as the ion-conductive alumina separator from cracking induced due to thermal stress.

The weldable first portion, the weldable second portion, the electrically insulating third portion and the optional fourth portion within the seal ring may be oriented or located relative to each other to minimize thermal stress during operation and heating of the seal ring. The fourth portion may be juxtaposed to the weldable second portion to an opposite side of the third portion.

With reference to FIG. 1, an energy storage device 100 includes a housing 102. The housing is cylindrical and has an outward facing surface 104 and an inward facing (or "inner") surface 106. The housing inner surface defines a device volume 108. The housing has a sealable first end 110. The housing first end has a peripheral edge (no reference number provided) that defines an opening or aperture 112 in the housing. An insert component system 114 is disposable in, and able to seal, the housing aperture. The insert component system includes a cap 120, a current collector 122, and a seal ring 124.

The cap interacts with the current collector to allow for electrical coupling of the current collector to outside of the energy storage device. The cap is secured to the seal ring in such a manner as discussed in further detail hereinbelow. The current collector extends into the housing volume. An electrically insulative and ionically conductive separator tube 130, within the housing volume, defines two electrically isolated compartments—an anode compartment 132 and a cathode compartment 134, which are arranged in the illustrated embodiment as shown. More particularly, the separator has an inward facing surface 140 that defines the cathode compartment, and an outward facing surface 142 that defines the anode compartment. The current collector, then, extends into the cathode compartment within the housing volume.

The seal ring is a toroid in the illustrated embodiment and has an inner surface 150 that defines a seal ring aperture 152 through which the current collector extends. A housing weld structure 154 secures the seal ring to the housing inner surface proximate to the housing first end. A cap weld structure 156 secures the seal ring to the cap.

The seal ring is a monolithic structure that has a plurality of compositionally and/or functionally definable zones. With reference to the seal ring shown in FIG. 1, there are three zones. An electrically insulative zone 160 extends through the seal ring body to electrically isolate a first weldable zone 162 from a second weldable zone 164. While the defining line between the zones appears as a step function change in the illustrated embodiment, in some other embodiments a transition sub-zone may be interposed between the zone interfaces where the compositional ratio or gradient changes as a function of location or distance. The first weldable zone secures to the housing inner surface via the housing weld structure. The second weldable zone secures to the cap via the cap weld structure. A cathode material can be added through an aperture, is not shown.

The metal content in the first and second weldable zones differs from each other in both amount and type. It is noted that in other embodiments, one or both of the metal type or amount may be the same. The housing in this instance is stainless steel, and the first weldable portion includes metal that matches the composition and properties of the housing. The cap in this instance is majority nickel in a nickel alloy. The second weldable portion includes metal that matches the composition and properties of the cap and the insert component system.

A separator seal structure 170 secures the seal ring to the separator. In this embodiment, the separator seal structure is a glassy material. Further, while relating specifically to the illustrated embodiment, the separator seal structure contacts and secures to the seal ring over portions of both the second weldable zone and the electrically insulative zone. In this configuration, the glassy material is selected to be electrically insulative and chemically resistant in the operating environment. Other considerations, such as glass transition temperature and thermal expansion coefficient may be taken into account for material selection.

With regard to welding the weldable portion to the mating surface arc welding, friction welding, laser or directed energy welding, ultrasonic welding, and gas welding may be used depending on the process specifications. For arc welding, a welding power supply creates and maintains an electric arc between an electrode and the base material to melt the target material at the welding point or welding line. The arc welder can use either direct (DC) or alternating (AC) current, and consumable or non-consumable electrodes. Flux may be present in some embodiments. A blanket of inert or semi-inert gas, known as a shielding gas, may protect the welding region, and filler material may be used. Electron beam welding (EBW) is a fusion welding process in which a beam of high-velocity electrons is applied to the materials being joined. The workpieces melt as the kinetic energy of the electrons is transformed into heat upon impact, and the filler metal, if used, also melts to form part of the weld. The welding may be done under vacuum to prevent dispersion of the electron beam.

In one embodiment, the weldable portions may be amenable to thermal compression bonding, which is a cermet-to-metal seal involving a mismatch of the thermal expansion rates of the materials used. During the cooling stage, after the firing process, the outer member forms a diffusion bond to the ceramic. The compressive forces created result in hermeticity.

EXAMPLES

Unless specified otherwise, ingredients are commercially available from such common chemical suppliers as Aldrich Chemical Company (Milwaukee, Wis.).

Example 1

Forming a Seal Ring

A cylindrical pressing form is filled with a suspension of cermet (alumina, refractory metal) particles made with polyvinyl organic binder. A piston presses and forms the suspension at an elevated temperature to form a first green portion that will ultimately form the first weldable portion. A uniaxial press with a pressure of 40 ksi is applied. After the piston is withdrawn, a second suspension is filled into the form in contact with the first green portion. The second suspension includes electrically insulative alumina powder and PVA binder. The piston presses and heats the intermediate component to form a second green portion. After the piston is withdrawn, a third cermet suspension (with binder and refractory metal powder) is filled into the form in contact with the second green portion. The metal content of the first and third suspensions is sufficient to allow for welding subsequent to manufacture. Particularly, the first suspension has about 50 percent by weight of metal relative to the alumina, and the second suspension has about 60 percent by weight of metal. The placement of the suspension materials relative to each other is selected based on the structural requirements of the end seal ring. In this instance, the third suspension does not contact the first green portion. The piston presses the third suspension at an elevated temperature.

The compacted cermet green structure is removed from the mold. The compacted cermet green structure is prefired at 1200 degrees Celsius. As needed, post press machining is performed. The prefired seal ring is sintered, in hydrogen, at a temperature of about 1800 degrees Celsius. For comparison, the experiment is repeated, but the sintered seal ring further is hot-isostatically-pressed at 2000 degrees Celsius to produce a fully dense body.

Example 2

Sealing an Energy Storage Device

A seal ring is formed as disclosed in Example 1. The seal ring is secured to a separator via a glass seal to form a seal ring assembly. The seal ring assembly is disposed in an energy storage device housing. A cap with a current collector is inserted into the seal ring aperture so that the current collector is in contact with a cathode fill material that is inside the separator. Alternatively, a ring or bridge piece with a current collector is inserted into the seal ring aperture. In a single substantially continuous process, the first and second weldable portions of the seal ring are welded to the housing inner surface and to the cap, respectively. The cathode materials can be added through the aperture in the bridge piece. The cap is then welded to the bridge piece. The weldable portions flow and seal with their respective mating surfaces to form a hermetic weld structure.

Example 3

Sealing an Energy Storage Device

A seal ring is formed as disclosed in Example 1. The seal ring is welded to the inner surface of the can using an arc welding process. In particular, a tungsten inert gas (TIG) welding process is used. Cathode material is filled into the separator inner volume. A cap is placed over the seal ring aperture to contact another weldable portion of the seal ring. The cap is welded to the seal ring using either the TIG process or the Plasma Arc Weld method (PAW). The energy storage device produced as in this example allows for the pre-production of the housing, seal ring, and separator sub-component. It is noted that other minor components of the energy storage device have been omitted for clarity. Such components may include a support shim for the separator, a wick for the anode material, and the like. These listed components may be disposed in an anode chamber, and pre-production approaches, such as in this example, may allow for increased productivity and/or increased protection for those pre-packaged components.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. An energy storage device, comprising:
   a first electrode;
   a second electrode;
   a case;
   a cap;

a seal ring for sealing the energy storage device located in a region formed by the first electrode, the second electrode, the case, and the cap, wherein the seal ring comprises a weldable first portion and a weldable second portion that are electrically isolatable from each other by an electrically insulating third portion comprising alumina disposed therebetween, wherein the weldable first portion is in a direct contact with the first electrode of the energy storage device and the weldable second portion is in a direct contact with the second electrode of the energy storage device, wherein at least one of the weldable first portion and the weldable second portion comprises a cermet, and wherein the weldable first portion is welded to an inner surface of a housing of the energy storage device and the weldable second portion is welded to a cap of the energy storage device.

2. The energy storage device as defined in claim 1, wherein the cermet comprises a ceramic material selected from a group consisting of alumina, silica, yttria, and ytterbia.

3. The energy storage device as defined in claim 1, wherein the cermet comprises at least one refractory metal.

4. The energy storage device as defined in claim 3, wherein the refractory metal comprises one or more of molybdenum, rhenium, tantalum, or tungsten.

5. The energy storage device as defined in claim 3, wherein at least one of the weldable first portion and the weldable second portion comprises at least one of nickel, iron, or chromium.

6. The energy storage device as defined in claim 3, wherein an amount of the refractory metal in the cermet material is in a range of from about 5 volume percent to about 50 volume percent.

7. The energy storage device as defined in claim 3, wherein an amount of the refractory metal in the cermet material is in a range of from about 51 volume percent to about 100 volume percent.

8. The energy storage device as defined in claim 1, wherein the electrically insulating third portion comprises alumina having a dielectric strength of more than 9 at 1 megahertz.

9. The energy storage device as defined in claim 1, further comprising:
   a double prime beta alumina separator placed inside a volume of the housing to create an anode compartment and a cathode compartment;
   wherein the seal ring further comprises a fourth portion of an alumina-based material having coefficient of thermal expansion that is within 10 percent of the coefficient of thermal expansion of double prime beta alumina separator.

10. The energy storage device as defined in claim 9, further including the double prime beta alumina separator and wherein the fourth portion of the seal ring is secured to the double prime beta alumina separator, and the weldable first portion, the weldable second portion, the electrically insulating third portion and the fourth portion within the seal ring are oriented or located relative to each other to minimize thermal stresses during operation and heating of the seal ring.

11. The energy storage device as defined in claim 1, further comprising a housing weld structure disposed between the first weldable portion and the housing, and a cap weld structure disposed between the second weldable portion and the cap.

12. The energy storage device as defined in claim 1, wherein the first electrode is an anode and the second electrode is a cathode, with a separator disposed therebetween.

13. The energy storage device as defined in claim 1, wherein the seal ring forms a hermetic weld structure.

14. The energy storage device as defined in claim 1, wherein a metal content of the weldable first portion and weldable second portion are different.

* * * * *